(No Model.)
J. W. EGAN.
REFRIGERATOR.
No. 417,414. Patented Dec. 17, 1889.
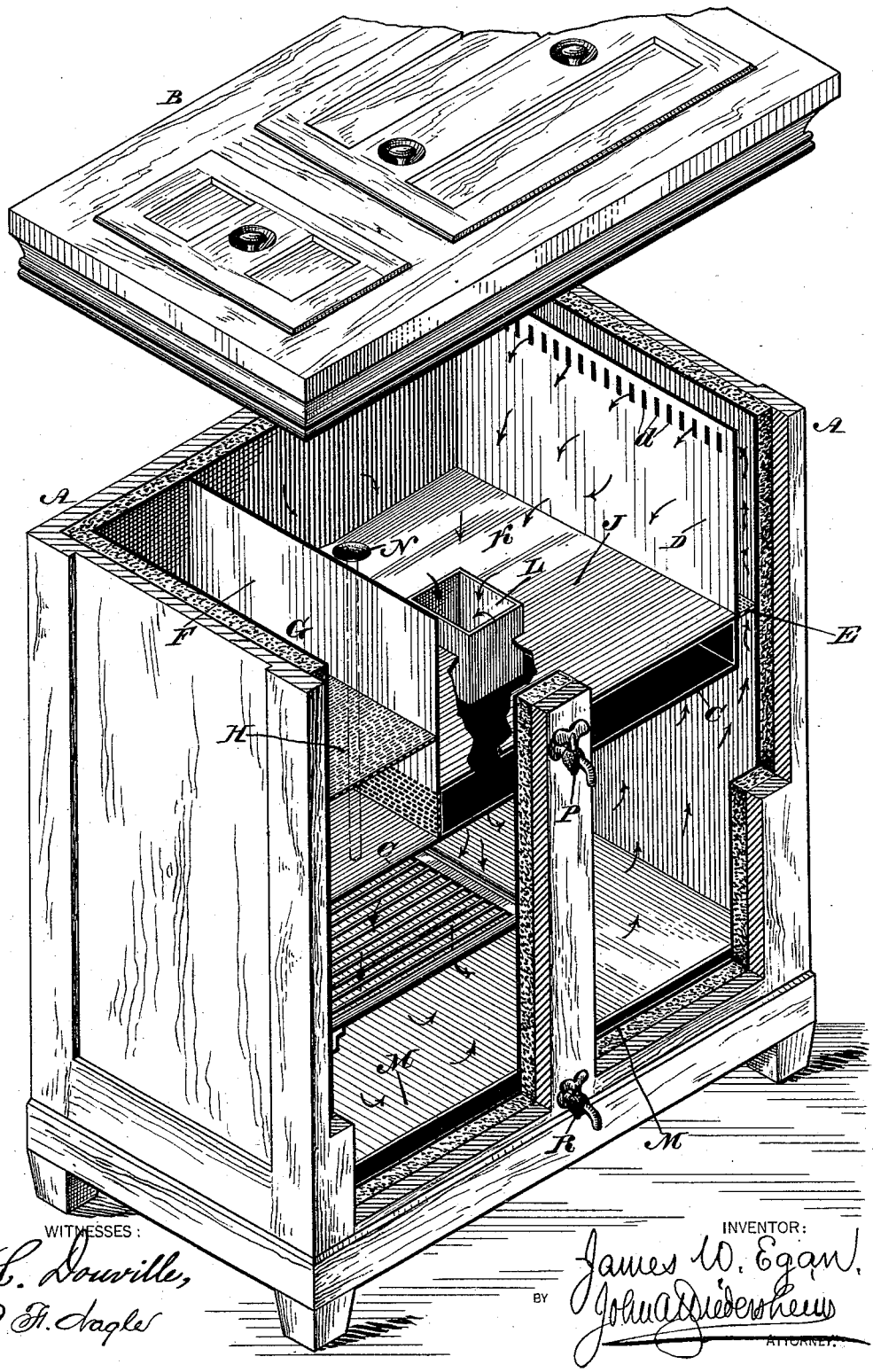
WITNESSES:
L. Douville,
P. H. Nagle
INVENTOR:
James W. Egan
BY John A. Wiedersheim
ATTORNEY.

UNITED STATES PATENT OFFICE.

JAMES W. EGAN, OF PHILADELPHIA, PENNSYLVANIA.

REFRIGERATOR.

SPECIFICATION forming part of Letters Patent No. 417,414, dated December 17, 1889.

Application filed June 15, 1889. Serial No. 314,441. (No model.)

*To all whom it may concern:*

Be it known that I, JAMES W. EGAN, a citizen of the United States, residing in the city and county of Philadelphia, State of Pennsylvania, have invented a new and useful Improvement in Refrigerators, which improvement is fully set forth in the following specification and the accompanying drawing.

My invention relates to refrigerators; and it consists in a novel arrangement of water filtering and storing chambers or tanks, together with cold-air-draft ducts and passages, and the construction of the parts to obtain the several desired results.

The figure represents a perspective view of a refrigerator embodying my invention, showing one side thereof broken away and the lid or cover removed.

Referring to the drawing, A designates the box or outer frame, having a lid or cover B, provided with openings to receive doors to give access to the ice-chamber and water-tank. The lower part of the box is also provided with doors for access to the storage-chamber. The walls and doors are packed with any suitable material and provided with a metallic lining. A metallic plate C extends almost entirely across the upper part of the interior of the box, and at its free end is attached to the end of a vertical plate D, having a series of perforations $d$ at its upper end. The plate D is located a short distance from the adjacent wall of the box, and has a metallic perforated plate E interposed between the same and the side of the box to form a bottom rest for packing. This latter construction provides a compartment which is filled with charcoal for an obvious purpose. A plate F is also mounted in a vertical position in the upper part of the box, and, with the plate C, upon which it rests, and the sides of the said box, provides a filtering-chamber G. The lower end of plate F is perforated to permit passage of water therethrough, and about midway between the plate C and the upper edges of the walls of the box a perforated plate H is interposed in a horizontal position, with its two sides in close connection, respectively, with the plate F and the end wall of the box. The space between the plates C and H is adapted to be filled with a suitable filtering material or materials. A plate J is mounted above the plate C in a horizontal position and has its edges attached to the plates D and F and the walls of the box. Said horizontal plates J and C, together with the lower parts of the vertical plates D and F, provide a tank for drinking-water, and between the upper surface of the plate J and the top of the box an ice chamber or receptacle K is formed, the side walls of which are composed of the plates D and F and the walls of the box.

A vertical flue pipe or duct L passes through the central part of the water-tank and forms a communication direct between the ice-chamber K and the storage-chamber. Two plates M M are horizontally disposed in the bottom part of the storage-chamber, one above the other, to form a flat tank for the reception of melted ice. This lower tank is connected with the ice-chamber by a vertical pipe N, having a funnel-shaped mouth at its upper end opening into the bottom part of said ice-chamber. The water-tanks have faucets or cocks P and R in connection therewith, so that an exterior outflow may be had. A storage-space is formed between the lower surface of the plate C and the upper surface of the top plate M, which may be provided with suitable racks, trays, or other conveniences.

The ice is placed in the chamber K in such manner as to leave the flue pipe or duct L unobstructed. The cold-air current starts downward through the flue L, circulates throughout the storage-chamber below, and then passes up through the passage or flue formed between the plate D and the adjacent side of the box A and through the apertures $d$ in the top of said plate D back into the ice-chamber. In passing up through the latter flue the current of air is continuously purified by the charcoal packing therein.

Water is placed in the chamber G and percolates through the plate H and the filtering substance or substances and enters the water-tank through the lower perforated end of the plate F. The water in this tank is adapted for drinking purposes, and will be kept at a low temperature by the ice in proximity thereto, and is readily obtained therefrom through the faucet P. The drain-water from the ice-chamber runs down through pipe N in the lower water-tank and is drained therefrom by the faucet R.

It will be understood that where necessary the joints of the several plates will be made water-tight; also, that any suitable filtering as well as packing substances will be employed.

When the lid or cover B is closed down on the box, it impinges tightly against the vertical plates D and F and the current of cold air forced through the apertures $d$ in the plate D and directly over the ice.

Having thus described my invention, what I claim as new, and desire to secure by Letters Patent, is—

1. In a refrigerator, an ice-chamber with openings in the upper part of one of its side walls, the said side wall being separate from the wall of the refrigerator, so as to form a passage between the same, charcoal filling in said passage, a storage-chamber below said ice-chamber, and a flue leading from ice to said storage-chamber, said parts being combined substantially as described.

2. In a refrigerator, an ice-chamber arranged directly over and in contact with a water-tank and having a flue to one side thereof and a central duct or flue passing through the water-tank, combined with a lower storage-chamber, substantially as described.

3. In a refrigerator, an ice-chamber with a passage on one side thereof and a filtering-chamber on the opposite side, a water-tank below said ice-chamber, a storage-chamber below said filtering-chamber and water-tank, and a flue leading from the ice-chamber through the said water-tank to the storage-chamber, the said passage on the side of the ice-chamber affording communication between the said ice-chamber and the storage-chamber, said parts being combined substantially as described.

4. In a refrigerator, a horizontal plate extending to within a short distance of one side of the outer frame thereof, vertical plates in connection therewith, providing sides for an ice and filter chambers, one of which is perforated at its upper end and the other at its lower end, the horizontal plate interposed between the vertical plates to form a water-tank, the flue-box extending through said water-tank, the lower water-tank, and a drain-pipe running thereto from the ice-chamber, substantially as described.

5. In a refrigerator, an ice-chamber having a water-tank below the same, a central flue leading from the ice-chamber through said water-chamber, a water-filtering chamber on the side of the ice-chamber and communicating with the said water-tank, and a storage-chamber below said filtering-chamber and water-tank, said parts being combined substantially as described.

6. In a refrigerator, an ice-chamber with a side passage having purifying material therein, a water-tank below said ice-chamber, a storage-chamber below said water-tank and a drip-chamber below said storage-chamber, a flue leading from the ice-chamber to the storage-chamber through the water-tank, and a drip-pipe leading from the ice-chamber through the water-tank and the storage-chamber, said parts being combined substantially as described.

7. A refrigerator having a top lid with openings therein and doors adapted to close said openings, an ice-chamber with a filtering-chamber on one side and a passage or channel on the opposite side, a water-tank fed from said filtering-channel and beneath the ice-chamber, a storage-chamber below said filtering-chamber and water-tank and a drip-chamber below said storage-chamber, a flue leading from the ice-chamber to the storage-chamber, and a pipe leading from the ice-chamber to the drip-chamber, the walls of the ice and filtering chambers forming a tight joint with the lid when the latter is closed, said parts being combined substantially as described.

JAMES W. EGAN.

Witnesses:
JOHN A. WIEDERSHEIM,
WM. C. WIEDERSHEIM.